United States Patent

Loss

[15] 3,674,132

[45] July 4, 1972

[54] CASSETTE RECEPTACLE

[72] Inventor: Michael Loss, 1879 Manor Drive, Union, N.J. 07083

[22] Filed: Sept. 2, 1970

[21] Appl. No.: 68,823

[52] U.S. Cl...........................206/1 R, 206/73, 206/DIG. 36, 220/20

[51] Int. Cl...........................B65d 85/67

[58] Field of Search................206/1 R, 73, 62 R, 16 R, 65 R, 206/65 K, DIG. 36; 220/20, 315

[56] References Cited

UNITED STATES PATENTS

| | | | |
|---|---|---|---|
| 3,584,738 | 6/1971 | Wallace | 206/1 R |
| 3,561,004 | 2/1971 | Kozu et al. | 206/1 R |
| 2,701,635 | 2/1955 | Mills | 206/73 |
| 2,851,188 | 9/1958 | Pavelle | 206/65 K |
| 2,808,148 | 10/1957 | Kerney | 206/1 R |
| 2,864,491 | 12/1958 | Paterson | 206/1 R |

*Primary Examiner*—William T. Dixson, Jr.
*Attorney*—Lerner, David & Littenberg

[57] ABSTRACT

A receptacle or the like for tape cassettes adapted to receive cassettes in interleaved fashion. The receptacle comprises partitions each of a width equal to the thickness of the abutments which protrude from the sides of tape cassettes and define the head portions or housings thereof. The partitions are positioned and shaped to fit in the voids defined by juxtaposed interleaved receptacles to maintain the juxtaposed receptacles in a desired parallel relationship. The interleaving of the cassettes results in a substantial space savings.

10 Claims, 6 Drawing Figures

INVENTOR.
MICHAEL LOSS
BY
LERNER, DAVID & LITTENBERG
ATTORNEYS

CASSETTE RECEPTACLE

BACKGROUND OF THE INVENTION

Cassettes of all types are currently in widespread use and it appears that such use will continue and greatly expand. They are used for storing both tape and film and other similar recording media and the like.

Present cassettes are in the form of substantially right prisms having an operative head portion or housing which is wider than the remainder of its right prism-like shape. This makes storage of the cassettes rather difficult and, in fact, most present cassette storage means comprise means for storing the boxes in which the cassettes are sold, not the cassettes themselves. Since collectors and the like accumulate a great number of cassettes, it is desirable that a storage receptacle or the like be provided which will accommodate a plurality of cassettes in as small a space as possible. Such a space savings would be especially advantageous as applied to any automated cassette feeding apparatus which may be in use or may be developed to permit one to play a number of cassettes in a desired sequence automatically, such as is presently done with phonograph records.

SUMMARY OF THE INVENTION

The present invention resides in a receptacle for storing cassettes and the like, and in particular in a receptacle for tape cassettes.

The presently preferred embodiment of a receptacle in accordance with the invention comprises a box having partitions which divide the interior of the box into a number of cassette receiving compartments. The box has a width such that cassettes are snugly received therein when disposed in parallel with the ends of the box. The partitions are each of a thickness substantially equal to the maximum width of the projections or abutments which project from the opposite sides of present cassettes and the partitions are shaped and positioned to be disposed within the dead spaces or voids defined by juxtaposed interleaved cassettes due to the spacing of the cassette walls caused by the abutments thereof.

The present invention may take many forms other than that of a box or the like. For example, it may be incorporated in a carousel type receptacle, in specially designed drawers, in a specially designed automotive glove compartment or the like, in automated cassette feeding trays or the like, etc. The term "receptacle" as used herein and in the claims is intended to cover all of such possible types of storage means.

Receptacles according to the present invention effect a substantial space savings. They not only save the space normally taken up by the containers or boxes in which cassettes are presently sold and normally stored, they also save an additional substantial amount of the space that would be required if the partitions did not fall within the dead spaces or voids formed between adjacent cassettes when they are stored in interleaved fashion.

DETAILED DESCRIPTION OF THE PREFERRED EMBODIMENTS

Figure 1:
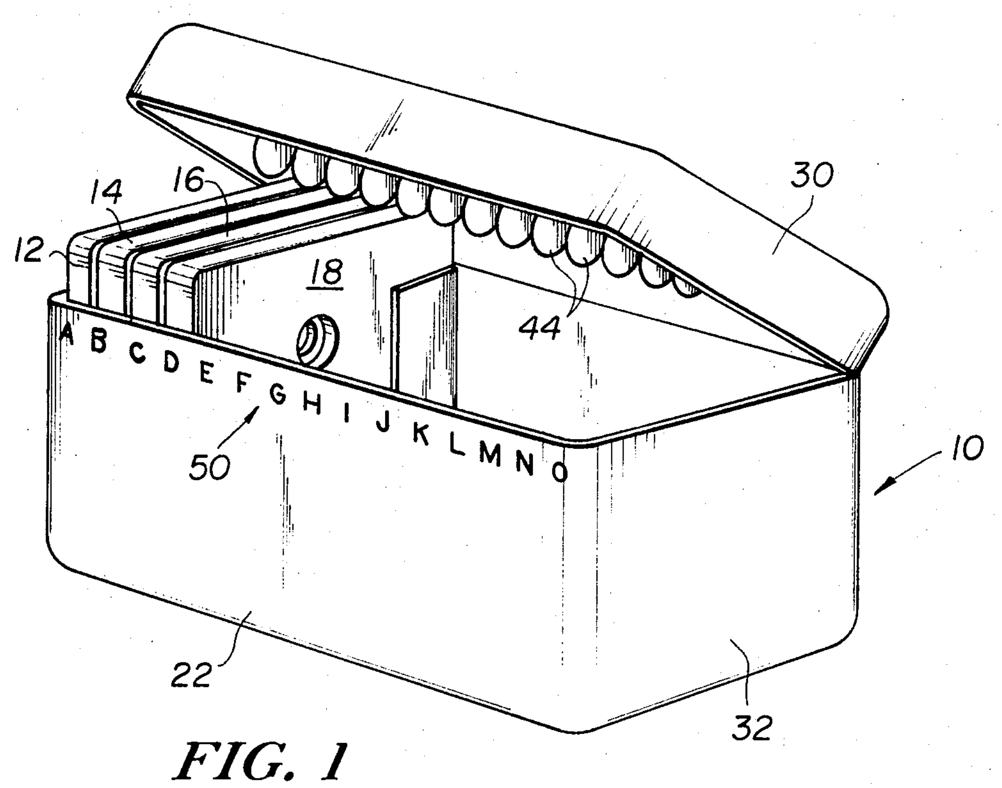
FIG. 1 is a perspective view of a first embodiment of a receptacle for cassettes or the like in accordance with the present invention.
Figure 2:
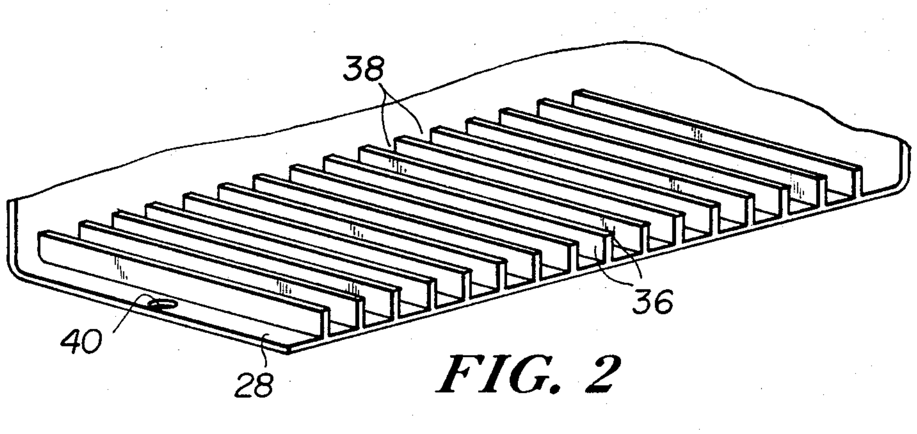
FIG. 2 is a perspective view of the bottom wall of the cassette receptacle of FIG. 1.
Figure 3:
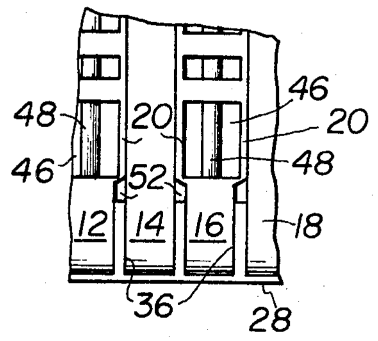
FIG. 3 is a partial side elevational cross-sectional view of the cassette receptacle of FIG. 1.
Figure 4:
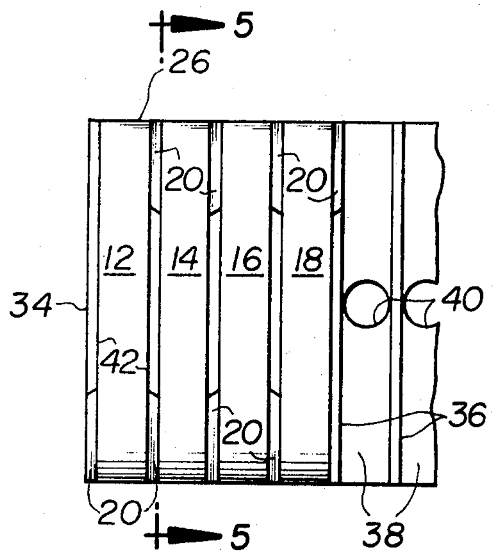
FIG. 4 is a partial plan view of the cassette receptacle of FIG. 1.

Referring to the drawings in which like reference numerals refer to similar parts throughout, a preferred embodiment of a cassette receptacle 10 in accordance with the present invention is shown in FIGS. 1, 2, 3 and 4. Four cassettes 12, 14, 16 and 18 are shown disposed in receptacle 10. It will be appreciated from FIGS. 1 through 4 that the cassettes are disposed in receptacle 10 in interleaved fashion. Thus, referring to FIG. 4, it will be noted, for example, that the abutments 20 of cassette 12 are disposed adjacent a first sidewall 22 while the abutments 24 of cassette 14 are disposed adjacent the opposite sidewall 26.

Receptacle 10 further comprises a bottom wall 28, top 30, and end walls 32 and 34. Partitions 36 divide the interior of receptacle 10 into separate cassette receiving compartments 38. Holes 40 are disposed approximately centrally of each cassette receiving compartment 38 for facilitating removal of a cassette therefrom. Depending upon the size of the cassettes, and therefore the cassette receiving compartments, the holes 40 may be sufficiently large to enable insertion of a finger therethrough for forcing a cassette upwards out of receptacle 10. Otherwise, a suitable instrument would be employed.

The partitions 36 are spaced apart to snugly receive the normal thickness of a cassette and each partition 36 has a thickness substantially equal to the maximum thickness of the abutments 20 which protrude from the sidewalls 42 of the cassettes. The partitions 36 and abutments 20 of juxtaposed cassettes cooperate to maintain the cassettes in a desired parallel relationship. This is aided by the sidewalls 22 and 26 which are spaced to snugly receive the width of the cassettes.

Top 30 is provided with a plurality of partitions 44 equal in number to the partitions 36 and each respectively disposed directly above a cooperating partition 36 to firmly hold cassettes in place when the top 30 is moved to its fully closed position. Partitions 44 each have a thickness substantially equal to the maximum thickness of the abutments 20. It as been found that stored cassettes will remain in the desired parallel relationship whether or not a top or a top with partitions is employed. However, the use of a top with partitions is preferred, especially when a great deal of handling of the receptacle is expected.

The illustrated cassettes 12, 14, 16 and 18 are tape cassettes and each include an opening 46 for exposing the tape 48. It will be noted in this regard that the abutments 20 cooperate to form a head portion or housing for the cassettes 12, 14, 16 and 18 at an edge thereof which edge includes the opening 46. The sidewalls 22 and 26 are preferably of a sufficient height to fully cover and protect the openings 46 when the cassettes are stored in receptacle 10 and the top 30 is open.

Cassette receptacle 10 is further provided with a legend 50 with a distinct identifying indicia, such as the capital letters A through L, for each cassette receiving compartment 38 to facilitate locating a desired stored cassette. Provision may be made for removable tags or the like which would cooperate with the legend so as to permit titles to be included and changed when different cassettes are stored.

It will be noted that the partitions 36 are disposed within the voids 52 (see FIG. 3) defined by the sidewalls 42 of juxtaposed receptacles 12, 14, 16 and 18. Partitions 36 cooperate with the abutments 20 of the juxtaposed cassettes to substantially align the cassettes in parallel relationship. It has been found that a single cassette can be stored in receptacles made in accordance with the present invention and it will remain in the desired upright position within its cassette receiving compartment.

Standard tape cassettes have a width of approximately five-eighths of an inch and oppositely disposed abutments each having a maximum thickness of approximately one-eighth of an inch. Thus, standard tape cassettes have maximum width of approximately seven-eighths of an inch. It has been found that a receptacle in accordance with the present invention having a width of approximately 4 ¼ inches can accommodate 12 such tape cassettes. It has been further found that if the cassettes are not interleaved, a width of approximately 5½ inches is required. Thus, there is a savings of approximately 25 percent when utilizing the present invention. Further, the present receptacle permits the cassettes to be retained in a desired relationship. It will be appreciated that greater or lesser percentage space savings may be effected with different types of cassettes or the like depending upon their shape and the proportion of the thickness of their abutment or abutments to their overall thickness.

Receptacles in accordance with the invention may employ partitions, such as the partitions 36 or 44, which extend from a sidewall or both sidewalls of the receptacle if the cassettes to be stored have abutments protruding only from one side. The partitions would then extend from their respective sidewalls toward the other sidewall to a distance short of where the abutment of a cassette to be stored with its abutment adjacent the said other sidewall would be positioned. The partition for the next adjacent cassette would extend from the said other sidewall to a position short of the first sidewall sufficient to accommodate the abutment of the next adjacent cassette.

Figure 5:
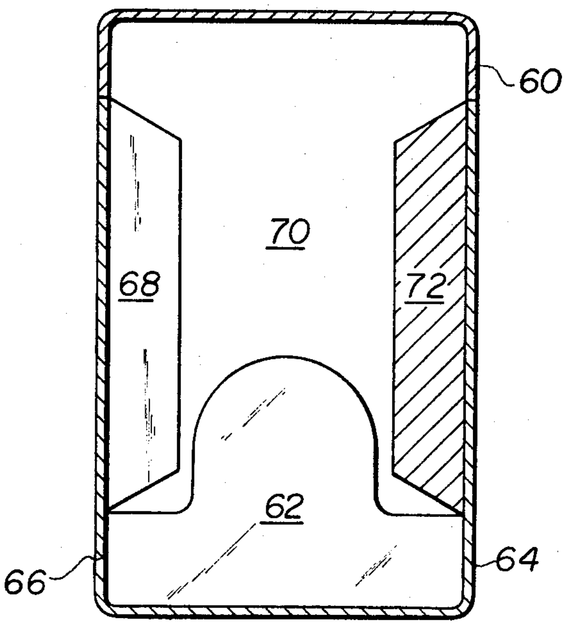
FIG. 5 is a end elevational cross-sectional view of a second embodiment of a cassette receptacle in accordance with the present invention.

Partitions in accordance with the present invention may take a variety of shapes, the only requirement being that they will be disposed within dead spaces or voids formed by juxtaposed interleaved cassettes. Thus, referring to FIG. 5 in which a second embodiment of a cassette receptacle 60 in accordance with the invention is shown, partition 62 includes side portions 64 and 66 which would be disposed below the abutment 68 of a cassette 70 and the abutment 72 of an adjacent cassette (not shown). Partition 62 further comprises a middle portion 74 which extends upwards between abutments 68 and 62. Partition 62 is of a thickness substantially equal to the maximum thickness of the abutments 68 and 72. The use of the maximum amount of the available dead space or voids permits the strongest possible partitions to be formed without decreasing the available space and which will firmly hold stored cassettes.

Figure 6:
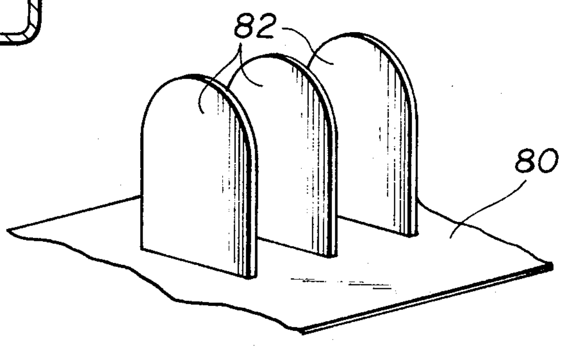
FIG. 6 is a partial perspective view of the bottom wall of a third embodiment of a cassette receptacle in accordance with the present invention.

The bottom wall 80 and partitions 82 of a third embodiment of a cassette receptacle in accordance with the present invention is shown in FIG. 6. The partitions 82 are designed to be disposed within the elongated vertically disposed voids formed by the abutments of juxtaposed interleaved cassettes. It will be appreciated that with the present shape, a plurality of stacks of cassettes could be stored in a deep receptacle and partitions, similar to the partitions 82, extended to fit within the voids formed by the juxtaposed interleaved stacked cassettes to permit a multiplicity of the number of the cassettes which can normally be stored by a receptacle designed to receive only a single such stack.

The present description has been by way of example only and is not intended to limit the scope of the present invention as defined in the appended claims. For example, it is within the scope of this invention to provide a cassette receptacle which comprises a plurality of partitions which are not identically shaped but which provide the desired parallel arrangement of stored cassettes and would be received in the voids defined by the stored cassettes.

What is claimed is:

1. A receptacle for storing a plurality of substantially identically shaped cassettes or the like:

each said cassette having an outer shape which includes a pair of parallel sidewalls and an abutment protruding outwardly from each of said sidewalls, and each said abutment terminating at a point below a middle portion of its respective sidewall;

said receptacle comprising a bottom wall, a pair of substantially parallel sidewalls connected to said bottom wall, and a plurality of substantially parallelly disposed partitions extending from at least one of said receptacle bottom wall and sidewalls, said partitions each being of a thickness substantially equal to the maximum thickness of said abutments, said partitions being shaped and positioned to define cassette receiving compartments in said receptacle for storing cassettes therein in substantially parallel relationship with respect to the cassette sidewalls and in interleaved fashion such that the abutment of one of any pair of stored juxtaposed cassettes will be adjacent one of said receptacle sidewalls and the abutment of the other of said juxtaposed cassettes will be adjacent the other of said receptacle sidewalls, said receptacle sidewalls being spaced to snugly receive cassettes disposed in said cassette receiving compartments, and said partitions are each shaped and positioned to be disposed in the voids defined by the sidewalls of juxtaposed cassettes due to the spacing of said sidewalls effected by said partitions and abutments.

2. A receptacle according to claim 1, wherein the cassettes are tape cassettes and each said abutment partially defines a housing which is open at the edge of its respective cassette defined by the said cassette sidewalls for exposing a portion of the tape therein, and said receptacle sidewalls are of a height sufficient to fully cover the openings of said cassette housings when the cassettes are fully received in the said cassette receiving compartments.

3. A receptacle according to claim 1, wherein said abutments are spaced above the bottom wall of said receptacle when the cassettes are received in said cassette receiving compartments, and said partitions are substantially identically shaped and extend from the bottom of the receptacle and terminate below the bottommost portions of said abutments when said cassettes are stored in said cassette receiving compartments.

4. A receptacle according to claim 3, wherein said partitions comprise parallelly disposed cassette receiving compartment walls which extend from one receptacle sidewall to the other receptacle sidewall and are of a substantially uniform height throughout their length.

5. A receptacle for storing a plurality of substantially identically shaped cassettes or the like:

each said cassette having an outer shape which includes a pair of parallel sidewalls and an abutment protruding outwardly from at least one of said sidewalls, and each said abutment terminating at a point below a middle portion of its respective sidewall;

said receptacle comprising a bottom wall, a pair of substantially parallel sidewalls connected to said bottom wall, and a plurality of substantially parallelly disposed partitions extending from at least one of said receptacle bottom wall and sidewalls, said partitions each being of a thickness substantially equal to the maximum thickness of said abutments, said partitions being shaped and positioned to define cassette receiving compartments in said receptacle for storing cassettes therein in substantially parallel relationship with respect to the cassette sidewalls and in interleaved fashion such that the abutment of one of any pair of stored juxtaposed cassettes will be adjacent one of said receptacle sidewalls and the abutment of the other of said juxtaposed cassettes will be adjacent the other of said receptacle sidewalls, said receptacle sidewalls being spaced to snugly receive cassettes disposed in said cassette receiving compartments, and said partitions are each shaped and positioned to be disposed in the voids defined by the sidewalls of juxtaposed cassettes due to the spacing of said sidewalls effected by said partitions and abutments, wherein said middle portions of said cassette sidewalls of juxtaposed interleaved cassettes stored in said cassette receiving compartments define vertically disposed elongated voids, and said partitions are substantially identically shaped and each extend from the bottom wall of said receptacle and are shaped and positioned to be fully received within said elongated voids.

6. A receptacle for storing a plurality of substantially identically shaped cassettes or the like:

each said cassette having an outer shape which includes a pair of parallel sidewalls and an abutment protruding outwardly from at least one of said sidewalls, and each said abutment terminating at a point below a middle portion of its respective sidewall;

said receptacle comprising a bottom wall, a pair of substantially parallel sidewalls connected to said bottom wall, and a plurality of substantially parallelly disposed partitions extending from at least one of said receptacle bottom wall and sidewalls, said partitions each being of a thickness substantially equal to the maximum thickness of said abutments, said partitions being shaped and positioned to define cassette receiving compartments in said receptacle for storing cassettes therein in substantially parallel relationship with respect to the cassette sidewalls and in interleaved fashion such that the abutment of one of any pair of stored juxtaposed cassettes will be adjacent one of said receptacle sidewalls and the abutment of the other of said juxtaposed cassettes will be adjacent the other of said receptacle sidewalls, said receptacle sidewalls being spaced to snugly receive cassettes disposed in said cassette receiving compartments, and said partitions are each shaped and positioned to be disposed in the voids defined by the sidewalls of juxtaposed cassettes due to the spacing of said sidewalls effected by said partitions and abutments, wherein said cassette abutments are spaced above the bottom wall of said receptacle when the cassettes are received in said cassette receiving compartments, and said partitions are identically shaped and extend from the bottom wall of said receptacle and each include a first portion terminating below the bottommost portions of said abutments and a second portion which extends from said first portion above the level of said bottommost portions of said abutments and between the abutments of stored juxtaposed interleaved cassettes.

7. A receptacle according to claim 1, wherein said partitions are substantially identically shaped, and the outer periphery of each of said substantially identically shaped cassettes substantially defines a right prism having a pair of substantially oppositely disposed substantially identical abutments protruding from said cassette sidewalls to define a thickness thereat equal to the normal thickness of each cassette plus the thicknesses of each cassette's pair of abutments.

8. A receptacle according to claim 1, further comprising holes in said at least one of said bottom wall and sidewalls from which said partitions extend, said holes being positioned between partitions within said cassette receiving compartments for facilitating removal of cassettes from said compartments.

9. A receptacle for storing a plurality of substantially identically shaped cassettes or the like:

each said cassette having an outer shape which includes a pair of parallel sidewalls and an abutment protruding outwardly from at least one of said sidewalls, and each said abutment terminating at a point below a middle portion of its respective sidewall;

said receptacle comprising a bottom wall, a pair of substantially parallel sidewalls connected to said bottom wall, and a plurality of substantially parallelly disposed partitions extending from at least one of said receptacle bottom wall and sidewalls, said partitions each being of a thickness substantially equal to the maximum thickness of said abutments, said partitions being shaped and positioned to define cassette receiving compartments in said receptacle for storing cassettes therein in substantially parallel relationship with respect to the cassette sidewalls and in interleaved fashion such that the abutment of one of any pair of stored juxtaposed cassettes will be adjacent one of said receptacle sidewalls and the abutment of the other of said juxtaposed cassettes will be adjacent the other of said receptacle sidewalls, said receptacle sidewalls being spaced to snugly receive cassettes disposed in said cassette receiving compartments, and said partitions are each shaped and positioned to be disposed in the voids defined by the sidewalls of juxtaposed cassettes due to the spacing of said sidewalls effected by said partitions and abutments, further comprising end walls which cooperate with said receptacle sidewalls and said receptacle bottom wall to form a box-shaped receiving container, and a top adapted to fit over and fully enclose said container and cassettes stored therein in its closed position, said top comprising a second plurality of depending partitions equal in number to the first plurality of partitions and each of a width substantially equal to the maximum thickness of said abutments, each second partition being disposed substantially in parallel with a cooperating first partition to retain stored cassettes in substantially parallel relationship.

10. A receptacle according to claim 1, further comprising means for distinctly identifying each of said cassette receiving compartments.

* * * * *